Patented Nov. 22, 1938

2,137,636

UNITED STATES PATENT OFFICE 2,137,636

MOISTUREPROOFING PROCESS AND PRODUCT PRODUCED THEREFROM

Harold J. Barrett, Wilmington, Del., assignor, by mesne assignments, to E. I. du Pont de Nemours & Company, Wilmington, Del., a corporation of Delaware No Drawing. Application December 29, 1934, Serial No. 759,691

17 Claims. (Cl. 91—68)

This invention relates to new compositions of matter which are useful for the preparation of sheets or films or for the coating of various articles. Particularly, the invention relates to waterproofing and moistureproofing compositions and to waterproofed and moistureproofed materials, especially of pellicular nature, such as are useful as wrapping tissues which can be prepared through the use of these compositions.

In accordance with the prior art numerous compositions of matter have been provided which have been designed to be resistant to the action of water in the sense of water repellancy. More recently, there have been provided compositions of matter capable of forming sheets, films, or coatings which are resistant to the passage therethrough of water vapor in addition to being water repellent. Compositions of matter of this latter type comprise a film-forming substance and a substance which serves as the basis for the ultimate moistureproofness, usually referred to as the moistureproofing agent. In one preferred embodiment, these compositions comprise a cellulose derivative and a wax, or wax-like substance, together with a resin or blending agent and a plasticizer for the cellulose derivative.

It has now been found that particularly advantageous moistureproofing compositions can be prepared with the use of certain synthetic film-forming resins in place of the cellulose derivative previously employed. These synthetic resins are particularly useful since they are characterized by good film forming properties, freedom from extreme brittleness, light color and freedom from tendency to discolor, as well as remarkable inertness to chemical influences including the action of water, acid and alkali. As film-forming ingredients, they possess desirable properties of hardness, toughness, rapidity of drying and the like. They are capable of forming continuous films when cast from solution by evaporating the solvent and the hardness of the synthetic resin (and consequently, to a considerable extent, the hardness of films containing them) may be controlled by the selection of resin-forming ingredients, by the extent of resin condensation or polymerization and other preparative conditions.

The synthetic resins of the type described are obtainable by the polymerization of esters of alpha-beta unsaturated organic acids and particularly alpha-methylene organic acids. Since the resins are derived by the polymerization of esters, they may be referred to conveniently as "polyester resins" and the use of this term throughout the present specification will be understood as referring to resins of this type. It should be clearly understood that resins of the type obtained by the condensation of polybasic acids with polyhydric alcohols, although truly of an ester type, are not contemplated by the term "polyester resins" as used throughout this specification. The details of the preparation and properties of polyester resins per se do not form a part of the present invention, but they are amply set forth in copending applications, for example, of Rowland Hill, Serial No. 645,318, filed December 1, 1932, of Emil D. Ries, Serial No. 667,984, now Patent No. 2,072,904, filed April 26, 1933, of Daniel E. Strain, Serial Nos. 668,080 and 668,081, now Patent No. 2,084,415, filed April 26, 1933, respectively, etc., and in issued patents, for example, of Rowland Hill, U. S. Patent No. 1,980,483, etc. The methods of resin preparation set forth in these applications will be found useful in preparing the polyester resins for the practice of the present invention.

It is an object of this invention to provide new compositions of matter suitable for use in the preparation of sheets or films, or useful for the coating of various materials, said compositions comprising a polyester resin and a moistureproofing agent.

It is also an object of this invention to provide a moistureproofing composition comprising a polyester resin and a moistureproofing agent, with or without other modifying ingredients, such as blending agents, other resins, plasticizers, or the like, and capable of yielding transparent, flexible, non-tacky, oil-proof, greaseproof, water-proof and moistureproof sheets, films or coatings.

It is another object of this invention to provide a moistureproof, flexible and preferably transparent sheet or film suitable for use as a wrapping tissue comprising a base sheet coated with a composition comprising a polyester resin and a moisture proofing agent.

Another object of this invention is to provide a composition of matter which can be cast into the form of films, filaments, tubes, caps or the like to produce a waterproof, flexible, moistureproof and preferably transparent structure.

A specific object of the invention is to provide a sheet or film comprising a base of cellulosic material coated with a composition comprising a polyester resin and a moistureproofing agent, the product being waterproof, flexible, non-tacky, moistureproof and preferably transparent and especially useful as a wrapping material.

The above and other objects will be apparent from the following description.

The synthetic resins used in the practice of this invention are the polymeric products obtained by the polymerization of esters of alpha methylene organic acids. Generally speaking, the polymerization may be effected by heating the monomeric ester in the presence of a suitable polymerization catalyst. Thus, for example, the monomeric ester may be mixed with about 1% by weight of benzoyl peroxide and the mixture heated for 6 hours at a temperature of 80° C. This particular treatment may be varied depending on the monomeric ester employed and the polymerization may be accomplished in many instances by heating at a higher temperature for a shorter period of time, or vice versa. Likewise, the amount of catalyst employed may be varied to suit the particular conditions at hand.

Resins prepared from the following monomeric esters are particularly useful in the practice of the present invention because of their toughness, flexibility and film-forming properties:

Resin A—by polymerization of methyl methacrylate

Resin B—by polymerization of methyl acrylate

Resin C—by polymerization of ethyl methacrylate

Resin D—by polymerization of a mixture containing 25% ethyl methacrylate and 75% methyl methacrylate Of the above mentioned specific polyester resins, it has been found that Resin A, obtained by the polymerization of methyl methacrylate (the methyl ester of alpha methylacrylic acid), is particularly valuable for the purposes of the present invention. Methyl methacrylate may be made by chlorinating isobutyric acid, esterifying the resultant chloro-isobutyric acid with methanol and removing hydrogen chloride from the methyl chloro-isobutyrate. Methyl methacrylate may also be prepared by treating methyl alpha hydroxy isobutyrate with a dehydrating agent such as phosphorus pentoxide or chlorosulfonic acid. The monomeric methyl methacrylate may be polymerized with the aid of radiant energy (light or heat) with or without a catalyst. The polymerization may be carried to completion, or if not, the monomeric ester should be removed. Thus, for example, the polymerization may be readily effected by the procedure mentioned above or alternatively a mixture of monomeric methyl methacrylate and 0.5% by weight of benzoyl peroxide may be heated at a temperature of 100° C. for 4 hours. The white product having somewhat the appearance of pumice may be used in the manufacture of the coating compositions of this invention. In the preparation of the composition, the polymer is preferably used in a subdivided condition to facilitate solution.

The polyester resins listed above have been found to be especially suitable for the purposes of this invention, but it is to be understood that the invention, in its broad aspects, is not limited to these particular materials. Thus, for example, useful polyester resins may be prepared by the polymerization of esters of acrylic acid, methacrylic acid, fumaric acid, itaconic acid, or the like. Thus, in addition to the above mentioned monomeric esters, use may be made of polyester resins obtained by the polymerization of ethyl acrylate, butyl acrylate, propyl methacrylate, butyl methacrylate, ethyl fumarate, ethyl itaconate, et cetera. In many cases it may be desirable to use interpolymers of two or more esters of these acids as the film-forming ingredient for moistureproof compositions and consequently a variety of interpolymers similar to that designated as Resin D above may be obtained. Obviously, the properties of resins of the polyester type can be varied widely by the choice of the polymerizable mono-esters, and in the case of the interpolymers by the proportions of the respective monomeric esters.

As the moistureproofing agent, it is possible to use any substance which will serve as the basis for moistureproofness. Such substances include synthetic or natural occurring waxes and wax-like materials. Among those moistureproofing agents of outstanding utility may be mentioned ceresin, beeswax, Chinese insect wax, and hydrocarbon waxes such as apple wax and particularly paraffin waxes such as those derived from petroleum, especially the higher melting variety. If a hard wax is desired to improve the surface characteristics of the final sheet, film or coating, it may be advantageous to use a small amount of carnauba or candelilla wax or some similar hard wax.

In many instances, it will be desirable to add other resins or gums to the composition. Generally speaking, moistureproofing compositions comprising polyester resins will be hazy unless resins or gums are added in the capacity of blending agents to improve the compatibility of the polyester resin and the moistureproofing agent with resultant improvement in transparency. As blending agents, such materials as gum dammar, ester gum, diethylene glycol hydrorosinate, hydrogenated castor oil phthalate, lanum or the like have been found particularly useful. Apart from any blending action which they may have, resins or gums are capable of improving the build, gloss and general surface characteristics of moistureproofing compositions comprising polyester resins, and in addition to the above mentioned blending agents, rosin, hydrogenated rosin, hydrogenated ester gum, beta-naphthylabietate, dilauryl phthalate, halogenated diphenyl resins, polybasic acid-polyhydric alcohol resins, or the like may be found useful in the formulation of compositions in accordance with the present invention. Likewise, such materials as chlorinated rubber, rubber derivatives obtained by the chemical treatment of rubber, highly chlorinated paraffin, and similar materials may be included in these moistureproofing compositions. In many instances, especially where transparency is not an essential characteristic, the gum or resin may be omitted completely.

Usually the flexibility of the final product may be improved by the addition of a plasticizing agent to the composition. When a plasticizer is used, it may be a compound or mixture of compounds having a relatively high boiling point and, of course, compatible with the polyester resin. Preferably the plasticizer will be odorless, tasteless and colorless. Tricresyl phosphate, dibutyl phthalate, triacetin, acetyl laurin, butyl benzoyl benzoate, dicyclohexyl phthalate, di (methoxyethyl) phthalate, dixylyl ethane, or any other suitable plasticizer for the specific polyester resin may be useful as a plasticizing agent. In certain cases it may be desirable to omit the plasticizer entirely, depending, of course, on the properties of the polyester resin which is used as the film-forming ingredient.

The compositions described may be used most conveniently when dissolved in an appropriate solvent which may be a single substance or a mixture of substances. Aromatic hydrocarbons such as benzene, toluene and xylene are good solvents, as are the more active organic solvents such as acetone, methyl ethyl ketone, ethyl acetate, butyl acetate, methoxyethanol, ethoxyethanol, ethylene dichloride and the like. If desired, non-solvents such as ethanol, butanol, mineral spirits and the like may be included as diluents, care being taken to use only such quantities of non-solvent materials as will still permit a clear, transparent and homogeneous composition.

The use of these compositions is not, however, limited to such solutions, for in many instances the use of a molten composition or an aqueous emulsion or dispersion in lieu of a solution may be found advantageous. The use of a molten composition will eliminate the use of solvents and the attendant recovery problem, while an aqueous emulsion or dispersion may be useful where no other method can be permitted because of undesirability of solvents or the like.

Other modifying agents may be employed to produce various effects. Thus colors, pigments or other decorative materials may be incorporated in the composition. It is obvious that where transparency is desired nothing will be introduced which will be detrimental to this property.

Among the principal uses of these compositions is their application as coating compositions to various base materials. As such base materials the present invention contemplates any which may be preserved or protected by the several properties of the composition. Thus, leather, fabrics or fibers, whether natural or synthetic, may be rendered moistureproof, and metals or wood may likewise be protected. The coating compositions are especially useful when applied to cellulosic bases (sheets, tubes, caps, et cetera) such as regenerated cellulose, glycol cellulose, cellulose glycolic acid, lowly etherified or lowly esterified celluloses (such as those containing only one constituent group for several cellulose units), cellulose derivatives including esters such as cellulose acetate, cellulose propionate, et cetera, mixed esters such as cellulose acetate propionate, ethers and mixed ether esters such as ethyl cellulose, benzyl cellulose, ethyl cellulose acetate, et cetera, various types of paper including bond, banknote, "Glassine", wrapping paper, rag or linen papers, or any of the special highly porous absorbent papers. Other base materials may also be treated with benefit with the novel coating compositions. Among these are protein base materials such as gelatin or casein; rubber and rubber derivatives are also suitable base materials.

The compositions described comprising a polyester resin and a moistureproofing agent can be made transparent, or they may be deliberately rendered translucent or opaque by means of modifying agents. The transparency of the final product obtained by applying the compositions as coatings will be, therefore, largely dependent on the transparency of the base material when a transparent coating is used. Thus a sheet or film of regenerated cellulose bearing a coating of the transparent type will remain of glass-clear transparency. However, the transparency of porous bases may be markedly improved; as for instance when paper is chosen as the base the compositions are frequently capable of transparentizing action in addition to the other properties previously enumerated. If the transparency is of paramount importance, it is obvious that a relatively transparent base will be chosen, and if a paper base must be used, one with a smooth surface is preferable such as a highly calendered tissue or a "glassine" paper.

In using the new compositions of matter, any of the methods well known to the art may be employed. Thus, for example, when moistureproofing coating compositions of this type are being used, they may be applied to the base by dipping, spraying, roller coating or the like. Preferably the coating is dried by means of warm air, the temperature of the drying chamber being approximately 90 to 110° C. The use of an elevated temperature is desirable when transparency and a high degree of moistureproofness are sought, the higher temperature serving to prevent separation or crystallization of the moistureproofing agent during the drying operation. It is frequently advantageous to subject the dried coated material to a humidifying atmosphere at an elevated temperature for a brief period in order to restore the proper amount of moisture to the base when the original moisture has been at least partially removed by the drying operation. Such a humidifying treatment may also serve to remove the last traces of solvent used in the application of the coating composition. A highly satisfactory method of applying the moistureproofing coating is set forth in the Charch et al. patents, U. S. 1,737,187 and U. S. 1,826,696–9 inclusive, which may be used to advantage in the practice of this invention.

For the purpose of this specification and claims, I define moistureproof materials as those which in the form of continuous, unbroken sheets or films permit the passage of not more than 690 grams of water vapor per hundred square meters per hour over a period of 24 hours at approximately 39.5° C. plus or minus 0.5° C., the relative humidity of the atmosphere at one side of the film being maintained at least at 98% and the relative humidity of the atmosphere at the other side being maintained at such a value as to give a humidity differential of at least 95%.

Moistureproofing coating compositions are defined as those which, when laid down in the form of a thin, continuous, unbroken film applied uniformly as a coating with a total coating thickness not exceeding 0.0005" to both sides of a sheet of regenerated cellulose of thickness approximately 0.0009", will produce a coated product which is moistureproof.

For the purposes of experimental test, especially for those materials adaptable as coating compositions, moistureproof materials include those substances, compounds or compositions which, when laid down in the form of a continuous, unbroken film applied uniformly as a coating with a total coating thickness not exceeding 0.0005" to both sides of a sheet of regenerated cellulose of thickness approximately 0.0009", will produce a coated sheet which will permit the passage therethrough of not more than 690 grams of water vapor per hundred square meters per hour over a period of approximately 24 hours at a temperature of 39.5° C. plus or minus 0.5° C. (preferably 39.5° C. plus or minus 0.25° C.) with a water vapor pressure differential of 50–55 millimeters (preferably 53.4 plus or minus 0.7 mm.) of mercury. For convenience, the number of grams of water vapor passed under these conditions may be referred to as "the permeability value". An uncoated sheet of regenerated cellulose having a thickness of approximately 0.0009" will show a permeability value of the order of 6900.

From the foregoing it is apparent that under the conditions set forth a moistureproof regenerated cellulose sheet is capable of restricting the passage of moisture or water vapor therethrough at least ten times as effectively as the uncoated regenerated cellulose sheet.

The following examples will serve to illustrate specific embodiments of the invention, especially as it relates to moistureproofing coating compositions.

*Example I*

| | Parts by weight |
|---|---|
| Resin A | 17.6 |
| Paraffin wax (M. P. 61–3° C.) | 0.7 |
| Tricresyl phosphate | 9.0 |
| Dewaxed dammar | 4.3 |
| Ethyl acetate | 130.0 |
| Toluene | 55.0 |

For convenience, this coating composition may be maintained at a temperature of about 40 degrees to prevent separation of the moistureproofing agent. The composition may be used for moistureproofing transparent sheets of regenerated cellulose, for example, by immersing the sheets in the solution or by otherwise coating them, removing the excess coating by suitable means, as by scraper rods, squeeze rolls or the like, and then drying preferably at a temperature of 90–110° C. The coated sheet is substantially colorless, odorless and tasteless and has excellent characteristics of slip, non-tackiness and gloss, as well as flexibility, oil- and grease-proofness, waterproofness, transparency, and moistureproofness.

As an example of the use of these new moistureproofing compositions on paper, "Glassine" paper may be coated with the above composition in the same manner as a sheet of regenerated cellulose, and dried at 90–110° C. The coated sheet is substantially colorless, odorless, and tasteless and has excellent characteristics of slip, non-tackiness, flexibility, oil and greaseproofness, as well as waterproofness and moistureproofness. In addition, it is somewhat more transparent and has somewhat higher gloss than uncoated "Glassine" paper.

As has been indicated above, the new moistureproofing compositions described herein may be used for coating other types of paper as well as "Glassine". However, in order to achieve moistureproofness, it is necessary that a continuous film of the moistureproofing composition be deposited on the surface of the paper. Hence, it is usually desirable to use compositions of high viscosity, i. e., of high solids content or compositions prepared from relatively high molecular weight polyester resins, for coating paper.

*Example II*

| | Parts by weight |
|---|---|
| Resin B | 7.0 |
| Paraffin wax (M. P. 61–3° C.) | 1.0 |
| Dewaxed dammar | 3.3 |
| Toluene | 46.0 |
| Ethyl acetate | 23.3 |
| Acetone | 20.0 |

Sheets of regenerated cellulose coated with this composition in the manner indicated under Example I result in a coated sheet which is translucent, flexible, waterproof, oil-proof, greaseproof, non-tacky, of good surface characteristics and moistureproof.

*Example III*

| | Parts by weight |
|---|---|
| Resin C | 7.0 |
| Paraffin wax (M. P. 61–3° C.) | 1.0 |
| Dewaxed dammar | 3.3 |
| Toluene | 46.0 |
| Ethyl acetate | 20.0 |
| Acetone | 20.0 |

Sheets of regenerated cellulose coated with this composition in the manner indicated under Example I result in a coated sheet which is transparent and moistureproof, as well as possessing the other general characteristics set forth in Example I.

*Example IV*

| | Parts by weight |
|---|---|
| Resin D | 7.0 |
| Paraffin wax (M. P. 61–3° C.) | 1.0 |
| Dewaxed dammar | 3.3 |
| Toluene | 46.0 |
| Ethyl acetate | 23.3 |
| Acetone | 20.0 |

Sheets of regenerated cellulose, for example, coated with this composition in the manner indicated under Example I result in a coated sheet which is transparent, flexible, water-proof, oil-proof, grease-proof, non-tacky, of good surface characteristics, and moistureproof.

The following example illustrates the formulation of a composition containing no gum or resin in addition to the polyester resin.

*Example V*

| | Parts by weight |
|---|---|
| Resin A | 19.4 |
| Paraffin wax (M. P. 61–3° C.) | 0.6 |
| Tricresyl phosphate | 0.4 |
| Ethyl acetate | 129.0 |
| Toluene | 55.0 |

This composition may be used for moistureproofing sheets of regenerated cellulose in the same manner as described under Example I. The coated sheet is not transparent, but it is moistureproof and possesses other useful and satisfactory characteristics.

The following example illustrates a composition containing no plasticizing agent.

*Example VI*

| | Parts by weight |
|---|---|
| Resin A | 10.0 |
| Dewaxed dammar | 3.3 |
| Paraffin wax (M. P. 61–3° C.) | 1.0 |
| Toluene | 30.0 |
| Ethyl acetate | 80.0 |

This composition when applied to sheets of regenerated cellulose in the manner described under Example I yields transparent, moistureproof coatings.

Compositions of the type described may be cast into self-sustaining structures such as sheets or films in much the same manner as cellulose derivative sheets (cellulose acetate, for example) are prepared, to yield a product having moistureproof properties in addition to its other desirable characteristics. The following example illustrates a suitable composition comprising a polyester resin and a moistureproofing agent suitable for casting thin sheets of films which are of themselves moistureproof.

Example VII

| | Parts by weight |
|---|---|
| Resin A | 15.0 |
| Dibutyl phthalate | 5.0 |
| Asiatic wax | 0.75 |
| Dammar | 5.0 |
| Toluene | 50.0 |
| Acetone | 15.0 |
| Ethyl acetate | 15.0 |

This composition may be cast on a smooth surface such as a glass plate or a highly polished metal surface at a temperature of about 40° C., and after the low boiling solvents have evaporated, it may be heated to about 100° C. in order to remove the last traces of all of the solvents. The final film which may be stripped from the casting surface and which may, for example, have a thickness ranging from 0.0005–0.0015" is transparent, flexible and moistureproof.

When using these new compositions as moistureproofing coatings, the desired effect may be obtained with the use of very thin coatings; thus, the total thickness of coating on both sides of a base may vary from 0.00001" to 0.00015" and still produce satisfactory results. It is not always necessary to coat both sides of a base. In such cases, as for example with a coated paper, the thickness of the coating on the one side may be of the same order as the total thickness when both sides are coated. For certain purposes thicker coatings may be desirable, and hence the invention is not limited to those coating thicknesses described above.

The compatibility of the polyester resin with the moistureproofing agent is dependent to a considerable extent on the chemical composition of these materials. Generally speaking, it will be found that if good transparency is desired, the ratio of moistureproofing agent to polyester resin should not be greater than 1:8. For the practice of the invention, a ratio within the range of 1:8 to 1:300 will be found to provide satisfaction.

The film thickness contributes to transparency, especially when the composition may comprise only a polyester resin and a moistureproofing agent. Since the degree of transparency tends to decrease with increased coating thickness, it is preferable to apply relatively thin coatings as previously indicated, although if transparency is not important the coating may be of any desired thickness.

When large proportions of a moistureproofing agent or greater film thickness are desired, or where a composition is needed which will give more certainly reproducible transparency, a blending agent may be employed to advantage. The amount of blending agent will depend on the particular type of polyester resin, the moistureproofing agent, and the ratio of these ingredients. Usually it is desirable in the interest of a high degree of moistureproofness to employ only sufficient blending agent to render the product just transparent. An unnecessarily large quantity of blending agent prevents the utilization of the full moistureproofing power of the moistureproofing agent. However, the amount of gum or resin in addition to the polyester resin may vary from 0 to 30% based on the weight of the solids in the coating composition.

The amount of plasticizing agent will depend on the flexibility desired in the final product and may vary from 0 to 30% based on the solids composition.

The moistureproofing compositions which are an object of this invention have a number of advantages over those previously known to the art. For example, compositions can be prepared according to the invention which may contain only two components, namely the polyester resin film-forming ingredient and the moistureproofing agent. The formulation of such compositions is considerably less difficult than of those previously known to the art which comprised several additional components. Furthermore, the solvents required for the formulations of these new compositions are easily available and economies in the choice of solvents and their recovery may be effected by proper formulation of compositions. The films or coatings obtained with the use of these compositions have desirable properties as regards transparency, flexibility, non-tackiness and good surface characteristics. They are substantially odorless, tasteless and non-toxic, as well as substantially non-inflammable. These coatings also adhere tenaciously to articles which are undercoated with any of the compositions known to the art, such as polybasic acid-polyhydric alcohol resin varnishes, phenol-aldehyde resin varnishes or the like. A still further advantage of these new moistureproofing compositions is their very remarkable property of producing coatings which are capable of sealing under the influence of heat at slight pressure. Thus, when two sheets of regenerated cellulose which have been moistureproofed with these compositions are placed in contact and touched with an iron at a temperature of 100–150° C., the two sheets will seal together and form an extremely secure union. Obviously this property is very desirable when a number of parcels are to be wrapped and sealed, as it eliminates the use of a solvent or an adhesive to secure the union.

Wrapping tissues such as may be obtained through the practice of the present invention are especially adaptable to the wrapping and preservation of merchandise of all kinds in view of their flexibility, transparency, waterproofness, oilproofness, grease-proofness, good surface characteristics of gloss, slip, non-tackiness, et cetera and particularly their moistureproofness.

As many widely different embodiments of this invention may be made without departing from the spirit and scope thereof, it is to be understood that the invention is not limited to the specific embodiments thereof except as defined in the appended claims.

I claim:

1. A moistureproofing composition comprising a wax material and a film-forming component, said film-forming component consisting of a polymerized alpha-beta, unsaturated acid ester said composition being capable of forming flexible, transparent, moistureproof, heat-sealable film.

2. A moistureproofing composition comprising a wax material and a film-forming component, said film-forming component consisting of a polymerized alpha-beta, unsaturated carboxylic acid ester said composition being capable of forming flexible, transparent, moistureproof, heat-sealable film.

3. A moistureproofing composition comprising a wax material and a film-forming component, said film-forming component consisting of a polymerized alkyl ester of an alpha-beta, unsaturated carboxylic acid said composition being capable of forming flexible, transparent, moistureproof, heat-sealable film.

4. A moistureproofing composition comprising a wax material and a film-forming component, said film-forming component consisting of a polymerized alkyl ester of an acrylic acid said composition being capable of forming flexible, transparent, moistureproof, heat-sealable film.

5. A moistureproofing composition comprising a wax material and a film-forming component, said film-forming component consisting of a polymerized alkyl ester of an alpha-alkyl acrylic acid said composition being capable of forming flexible, transparent, moistureproof, heat-sealable film.

6. A moistureproofing composition comprising a wax material and a film-forming component, said film-forming component consisting of a polymerized alkyl ester of methacrylic acid said composition being capable of forming flexible, transparent, moistureproof, heat-sealable film.

7. A moistureproofing composition comprising a wax material and a film-forming component, said film-forming component consisting of polymerized methyl methacrylate said composition being capable of forming flexible, transparent, moistureproof, heat-sealable film.

8. A moistureproofing composition comprising a wax and a film-forming component, said film-forming component consisting of polymerized methyl methacrylate said composition being capable of forming flexible, transparent, moistureproof, heat-sealable film.

9. A moistureproofing composition comprising a wax material and a film-forming component, said film-forming component consisting of polymerized methyl methacrylate, the methyl methacrylate and wax being present in proportions of 8:1 to 300:1, a blending agent present in an amount within 0–30% of the total solids in said composition, and a plasticizer present in an amount within 0–30% of the total solids in said composition said coating being capable of forming flexible, transparent, moistureproof, heat-sealable film.

10. A moistureproof material comprising a base coated with a wax material and a film-forming component, said film-forming component consisting of a polymerized alpha-beta, unsaturated acid ester said coating being transparent, flexible, moistureproof, and heat-sealable.

11. A flexible, transparent, moistureproof, heat sealable film comprising a non-fibrous cellulosic base coated with a composition comprising a wax material and a film-forming component, said film-forming component consisting of a polymerized alpha-beta, unsaturated carboxylic acid ester.

12. A flexible, transparent, moistureproof, heat sealable film comprising a non-fibrous cellulosic base coated with a composition comprising a wax material and a film-forming component, said film-forming component consisting of a polymerized alkyl ester of an alpha-beta, unsaturated carboxylic acid.

13. A flexible, transparent, moistureproof, heat sealable film comprising a non-fibrous cellulosic base coated with a composition comprising a wax material and a film-forming component, said film-forming component consisting of a polymerized alkyl ester of an acrylic acid.

14. A flexible, transparent, moistureproof, heat sealable film comprising a non-fibrous cellulosic base coated with a composition comprising a wax material and a film-forming component, said film-forming component consisting of a polymerized alkyl ester of an alkyl acrylic acid.

15. A flexible, transparent, moistureproof heat sealable film comprising a non-fibrous cellulosic base coated with a composition comprising a wax material and a film-forming component, said film-forming component consisting of a polymerized alkyl ester of methacrylic acid.

16. A flexible, transparent, moistureproof, heat sealable film comprising a non-fibrous cellulosic base coated with a composition comprising a wax material and a film-forming component, said film-forming component consisting of polymerized methyl methacrylate.

17. A flexible, transparent, moistureproof, heat sealable film comprising a non-fibrous cellulosic base coated with a composition comprising a wax and a film-forming component, said film-forming component consisting of a polymerized methyl methacrylate.

HAROLD J. BARRETT.